US006998814B2

(12) United States Patent
Wang et al.

(10) Patent No.: US 6,998,814 B2
(45) Date of Patent: Feb. 14, 2006

(54) METHOD FOR MEASURING THE ELECTROMOTIVE FORCE CONSTANT OF MOTORS

(75) Inventors: Shyh-Jier Wang, Hsinchu (TW); Shir-Kuan Lin, Hsinchu (TW); Meng-Hsun Hsieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/825,302

(22) Filed: Apr. 16, 2004

(65) Prior Publication Data

US 2005/0140318 A1 Jun. 30, 2005

(30) Foreign Application Priority Data

Dec. 26, 2003 (TW) .............................. 92137226 A

(51) Int. Cl.
*H02P 1/24* (2006.01)

(52) U.S. Cl. ...................... 318/729; 318/809; 318/438; 318/700

(58) Field of Classification Search ................ 318/729, 318/809, 438, 700, 701, 254, 138, 439; 324/503
See application file for complete search history.

(56) References Cited

U.S. PATENT DOCUMENTS

| | | | | |
|---|---|---|---|---|
| 5,861,727 A * | 1/1999 | Blackburn et al. | .......... | 318/701 |
| 6,002,234 A * | 12/1999 | Ohm et al. | ................. | 318/729 |
| 6,447,441 B1 * | 9/2002 | Yu et al. | ........................ | 600/16 |
| 2002/0105335 A1 * | 8/2002 | Mir et al. | .................. | 324/503 |

FOREIGN PATENT DOCUMENTS

| | | |
|---|---|---|
| TW | 488125 A | 5/2002 |

* cited by examiner

*Primary Examiner*—Karen Masih
(74) *Attorney, Agent, or Firm*—Birch, Stewart, Kolasch & Birch, LLP

(57) ABSTRACT

A method for measuring the electromotive force of motors is provided. The method enables the motor to rotate in single phase mode, and thereby measures the electromotive force constant of the motor. According to the principles and the method, motors do not have to work in close-loop. Neither encoders for detecting angle displacement or angle velocity are needed for motors, nor the motor impedance or current have to obtain in advance. Compared with the prior art, the disclosed method is more efficiency and economic.

11 Claims, 8 Drawing Sheets

METHOD FOR MEASURING THE ELECTROMOTIVE FORCE CONSTANT OF MOTORS

This Nonprovisional application claims priority under 35 U.S.C. § 119(a) on Patent Application Ser. No(s). 092137226 filed in Taiwan on Dec. 26, 2003, the entire contents of which are hereby incorporated by reference.

BACKGROUND OF THE INVENTION

1. Field of Invention

The invention relates to a method for measuring the electromotive force constant of motors, and more particularly to a method for measuring the electromotive force constant when motors work in single phase 2. Related Art Three phases permanent magnet motors, which are also called Permanent Magnet Synchronous Motors or DC brushless motors, are dominant in the industry because of their superior control and response. The most common examples are servo motors used in the automation industry, or spindle motors of disk drives to hard disks used in the Office Automation (OA) field.

The general three-phase permanent magnet motors are in Y-connection structure, which can be categorized in three-wired types and four-wired types according to wires of motors. Three-wired type motors have a three-phased winding to be connected with motor drivers. The servo motors used in factory automation belong to this category. Four-wired type motors have three phase windings and a neutral winding. The small permanent magnet motors used in the Office Automation (OA) field belong to this category.

In the magnetic parameters of permanent magnet motors, the electromotive force constant $K_{emax}$, which is equal to the torque constant in M.K.S., is closely linked to the motor performance, driving force and operation. The prior art discloses some solutions for measuring the electromotive force constant.

One of the solutions is an off-line anti-electromotive force approach, which utilizes a servo controllable motor to connect with a to-be-tested motor. The to-be-tested motor is open, i.e., is not connected with any drivers. Once the motor rotates in constant electrical angle velocity ωr, the electromotive force of the to-be-tested motor is obtained through the electromotive force, induced by any two phases.

However, the approach has some technical problems. For example, an expensive controllable motor and drivers are necessary. A clip fixture is also needed for coupling the two motors without slant. If the two motors slant too serous, the servo motor may not rotate smoothly in constant velocity because the load and the bearing of the to-be-tested motor is also easily damaged. Furthermore, some spindle motors employing sir bearings for hard disks lose the air characteristic after coupling with another motor. Therefore, such kinds of motors are not suitable for this approach.

The other solution is the on-line vector control estimation approach. The reference coordinates for servo permanent magnet motors often adopt a rotator coordinates system. Therefore, when the input current of the q axis is set to be constant and the input current of the d axis is set to be 0, the motor rotates in fixed torque. After current control performed by two close-loop controllers until the loop is in steady state, the back electromotive force constant is obtained accordingly.

However, the above approach is time consuming and cost wasting because of the servomotors. Furthermore, when applying the approach to small motors, additional circuits are needed, and a precise encoder attached on the motor is also needed for implementation. Meanwhile, in this method, the estimation error of the current and the resistor, and the design of controllers affect the measured electromotive force constant $K_{emax}$.

R.O.C patent publication No. 488125 discloses a method for identifying the magnetization of rotators through the electromotive force constant. Some auxiliary windings are wound on the stator core for sensing the magnetic flux of the magnetic field of the rotator. The electromotive force constant is obtained through the electromotive force induced on the auxiliary windings.

However, this method is only suitable for the magnetization of rotators when manufacturing motors. The auxiliary windings are especially subscribed and the motor has to be driven in constant velocity and close loop. This method is not suitable for finished motors because the stators can not be refit. Furthermore, if the motors do not have a velocity sensor, the close loop control is not provided for constant rotating.

The electromotive force constant $K_{emax}$ affects the motor performance, driving force, and operation. However, the prior art did not provide effective solutions for this technical problem. Therefore, a method for measuring the electromotive force constant is necessary for motor technology.

SUMMARY OF THE INVENTION

In view of the aforesaid disadvantages, the main object of the invention is to provide a method for measuring the electromotive force constant of motors that substantially obviates one or more of the problems, due to limitations and disadvantages of the related art.

Therefore, to achieve the object and other advantages in accordance with the invention, as embodied and broadly described herein, the method of the invention first enables the motor to rotate in single phase mode, and then measure phase voltages of the motor when the motor rotates to a predetermined velocity; at last, obtains the electromotive force constant of the motor according to the relationship of the phase voltages and the predetermined velocity.

According to the principles and the method of the invention, the method utilizes a simple approach to measure the electromotive force constant $K_{emax}$ of permanent magnet motors. The approach measures the three phase's voltage of motors in signal phase rotating mode, and obtains the constant accordingly. It is noted that motors do not have to work in close-loop. Therefore, neither encoders for detecting angle displacement or angle velocity are needed for motors, nor have the motor impedance or current to obtain in advance. Compared with the prior art, the disclosed method is more efficient and economic. Therefore, the disclosed method may apply to motors for factory automation or small office automation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus does not limit the present invention, wherein.

DETAILED DESCRIPTION OF THE INVENTION

Figure 1:
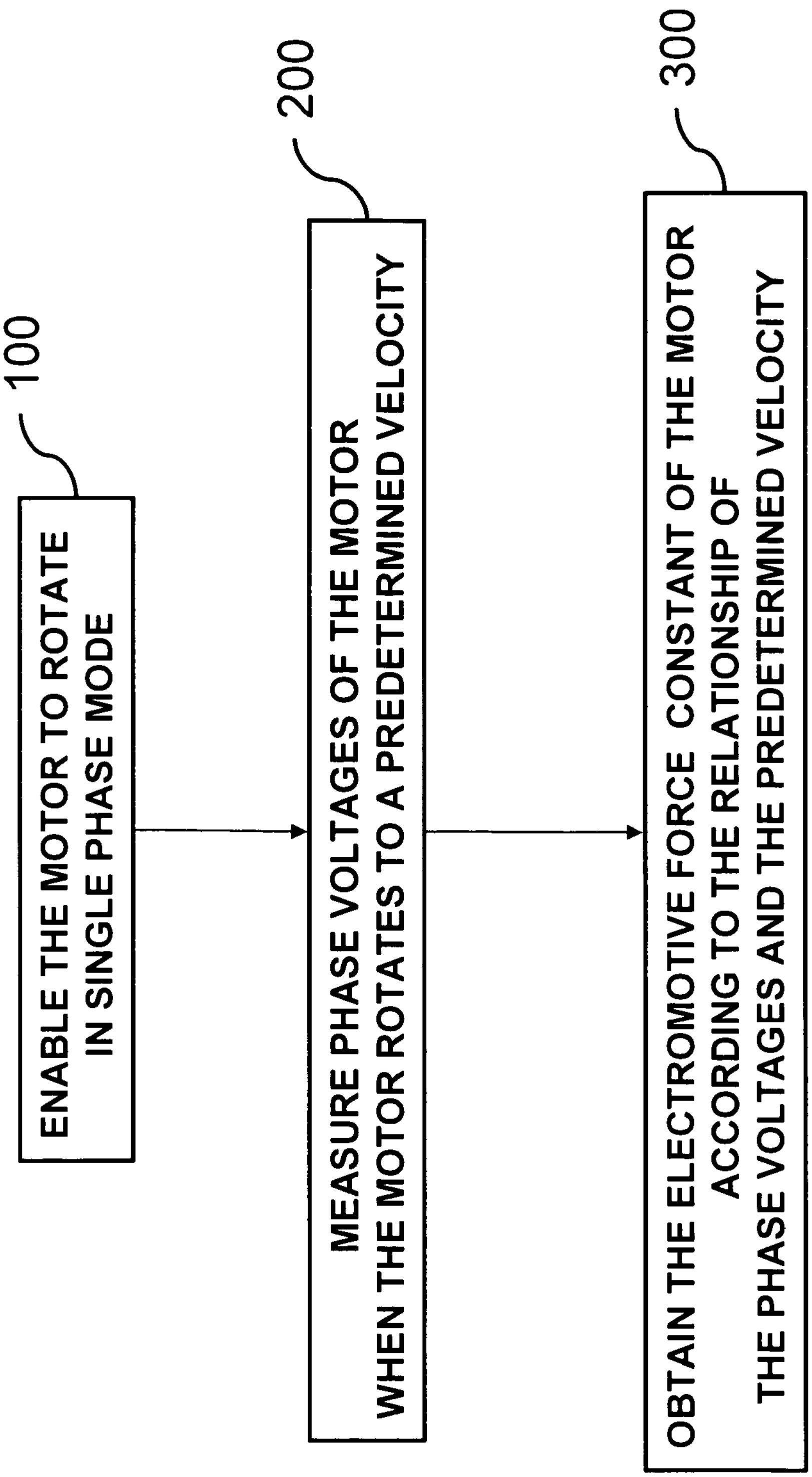
FIG. 1 illustrates the flow chart of the method for measuring electromotive force constant of motors of the invention.

Refer to FIG. 1 illustrating the flow chart of the method for measuring the electromotive force constant of motors of the invention. In the embodiment of FIG. 1, a three phase permanent magnet motor is taken as an example. First, the three phase permanent magnet motor is enabled to rotate in single phase mode (step 100). In single phase mode, one phase of the motor, for example, phase c, is always open, and the other two phases, for example, phase a and b, are connected in series. The phases current of phase a and b are equal. The single phase mode, for example, may be enabled by a three-phased driver to a one-phased driver.

When the motor rotates to a predetermined velocity in single mode, measure the phase voltages $v_a$, $v_b$, and $v_c$ of the motor (step 200). It is noted that the predetermined velocity may or may not be stable. Then, the electromotive force constant is obtained according to a voltage variable, which is a function of time derived from the phase voltages (step 300).

The principle of the invention is described in details in the following paragraphs.

Generally speaking, the electrical math model of a three phase permanent magnet motor is expressed as:

$$\begin{bmatrix} v_{as} \\ v_{bs} \\ v_{cs} \end{bmatrix} = \begin{bmatrix} r_s & 0 & 0 \\ 0 & r_s & 0 \\ 0 & 0 & r_s \end{bmatrix} \begin{bmatrix} i_a \\ i_b \\ i_c \end{bmatrix} + \begin{bmatrix} L_s & -M & -M \\ -M & L_s & -M \\ -M & -M & L_s \end{bmatrix} \begin{bmatrix} \dot{i}_a \\ \dot{i}_b \\ \dot{i}_c \end{bmatrix} + \frac{2\omega_r K_{emax}}{P} \begin{bmatrix} \cos\theta_r \\ \cos\left(\theta_r - \frac{2\pi}{3}\right) \\ \cos\left(\theta_r + \frac{2\pi}{3}\right) \end{bmatrix} \tag{1}$$

Wherein $v_{as}$, $v_{bs}$, and $v_{cs}$ are the terminal voltages of the three phases of the motor; $v_a$, $v_b$, and $v_c$ are respective voltages of the neutral voltage $v_s$; $i_a$, $i_b$, $i_c$ are the phase current of the motor; P is the number of the magnetic pole of the rotator magnet; $r_s$, $L_s$, M are the resistor, self-induction, and the mutual induction of each phase respectively; $\omega_r$ is the rotational speed of the electrical angle of the rotator; $\theta_r$ is the electrical angle of the rotator; and $K_{emax}$ is the electromotive force constant of the motor.

The mechanic model is expressed as:

$$\begin{aligned} T_e &= K_{emax}\left(\left(i_a - \frac{i_b}{2} - \frac{i_c}{2}\right)\cos\theta_r + \frac{\sqrt{3}}{2}(i_b - i_c)\sin\theta_r\right) \\ &= \frac{2J}{P}\dot{\omega}_r + \frac{2B_m}{P}\omega_r + T_L \end{aligned} \tag{2}$$

Wherein $T_e$ is the output torque of the motor, J is the moment inertia, $B_m$ is damping ratio of the motor, and $T_L$ is the loading of the motor.

Figure 2:
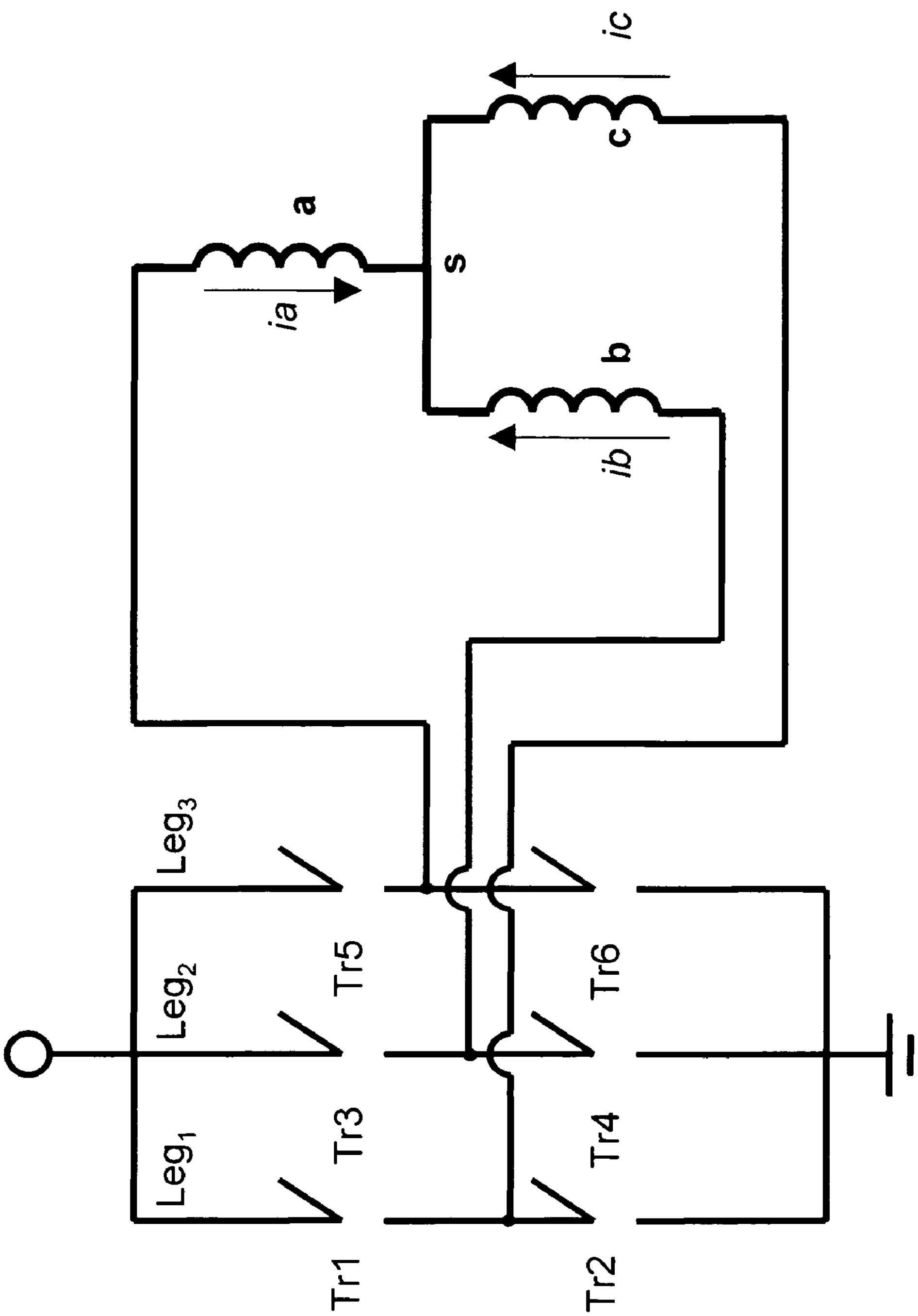
FIG. 2 illustrates the circuitry of the three phases permanent magnet motor connected with the motor driver.

The three phase permanent magnet motor and the driver are connected as illustrated in FIG. 2. The driver of FIG. 2 is composed of three electrical bridges, $Leg_1$, $Leg_2$, and $Leg_3$. Each electrical bridge has two power elements, which are Tr1, Tr2, Tr3, Tr4, Tr5, and Tr6. The power elements, for example, may be transistors, MOSFET, IGBT. The reference numbers a, b, c are the three phase windings. The reference number s is neutral line. The reference number $i_a$, $i_b$, $i_c$ are the phase current of the motor.

When the motor rotates in single phase mode, only two phases have current flowing by. For example, these two conducted phases are phase a and phase b, and phase c is open. Meanwhile, $i_a=-i_b=i$ and $i_c=0$. In single phase mode, only power element Tr3, Tr4, Tr5, and Tr6 function. Accordingly, the aforementioned model is re-expressed as:

$$\begin{bmatrix} v_{as} \\ v_{bs} \\ v_{cs} \end{bmatrix} = \begin{bmatrix} r_s & 0 & 0 \\ 0 & r_s & 0 \\ 0 & 0 & r_s \end{bmatrix} \begin{bmatrix} i \\ -i \\ 0 \end{bmatrix} + \begin{bmatrix} L_s & -M & -M \\ -M & L_s & -M \\ -M & -M & L_s \end{bmatrix} \begin{bmatrix} \dot{i} \\ -\dot{i} \\ 0 \end{bmatrix} + \frac{2\omega_r K_{emax}}{P} \begin{bmatrix} \cos\theta_r \\ \cos\left(\theta_r - \frac{2\pi}{3}\right) \\ \cos\left(\theta_r + \frac{2\pi}{3}\right) \end{bmatrix} \tag{3}$$

$$T_e = \sqrt{3}\,K_{emax}\,i\cos\left(\theta_r + \frac{\pi}{6}\right) = \frac{2J}{P}\dot{\omega}_r + \frac{2B_m}{P}\omega_r + T_L \tag{4}$$

From equation (3) and (4), Once the phase of the current i provided by the driver is the same as $\cos(\theta_r+\pi/6)$, the output torque $T_e>0$ is such, that the motor rotates continuously. And the magnitude of the current i may vary with time unlimitedly.

Define $v_\omega(t)$ as a function of time, and use equation (3) to derive an equation as follows:

$$v_\omega(t) = K_{emax}\cos\left(\theta_r + \frac{2\pi}{3}\right)\omega_r = \left(\frac{v_a + v_b - 2v_c}{-3}\right)\left(\frac{P}{2}\right) \tag{5}$$

Accordingly, $K_{emax}$ may be obtained by:

$$K_{emax} = \frac{\max(v_\omega(t))}{\omega_r} \tag{6}$$

Therefore, once the phase voltages $v_a$, $v_b$, $v_c$ and the rotating speed $\omega_r$ are obtained, the electromotive force constant may be obtained from equation (6). The rotating speed $\omega_r$ may, for example, be measured by velocity sensor, such as a position encoder. The electromotive force constant is then delivered after the speed is measured.

Furthermore, the electromotive force may also be obtained through integral of equation (5). Define $v_\theta(t)$ as a function of time, and expressed as:

$$\begin{aligned} v_\theta(t) &= \int_0^t v_\omega(\tau)d\tau \\ &= K_{emax}\sin\left(\theta_r(t) + \frac{2\pi}{3}\right) - K_{emax}\sin\left(\theta_r(0) + \frac{2\pi}{3}\right) \\ &= K_{emax}\sin\left(\theta_r(t) + \frac{2\pi}{3}\right) + v_{dc} \end{aligned} \tag{7}$$

$v_\theta(t)$ is the integral of $v_\omega(t)$. $v_{dc}$ is a direct current (DC) bias constant. Therefore, $K_{emax}$ is obtained by the following equation:

$$K_{emax}=\max(AC(v_\theta(t))) \tag{8}$$

The key of Equation (8) is to take the accelerating current (AC) of $v_\theta(t)$, and then take the peak value. Equation (8) is very suitable for the motors whose position encoder's solution is not sufficient, so the precise velocity can not be obtained.

The above method is also suitable for the situation that the output current provided by the driver is 0. When the motor rotates to a predetermined velocity, and turns off the power of the driver suddenly, if the moment inertia of the rotator is sufficient, the motor still rotates for a period of time. Accordingly, during the period, the electromotive force is obtained by Equation (6) or Equation (8).

The principle of the invention is put to the proof by the following examples.

Figure 3:
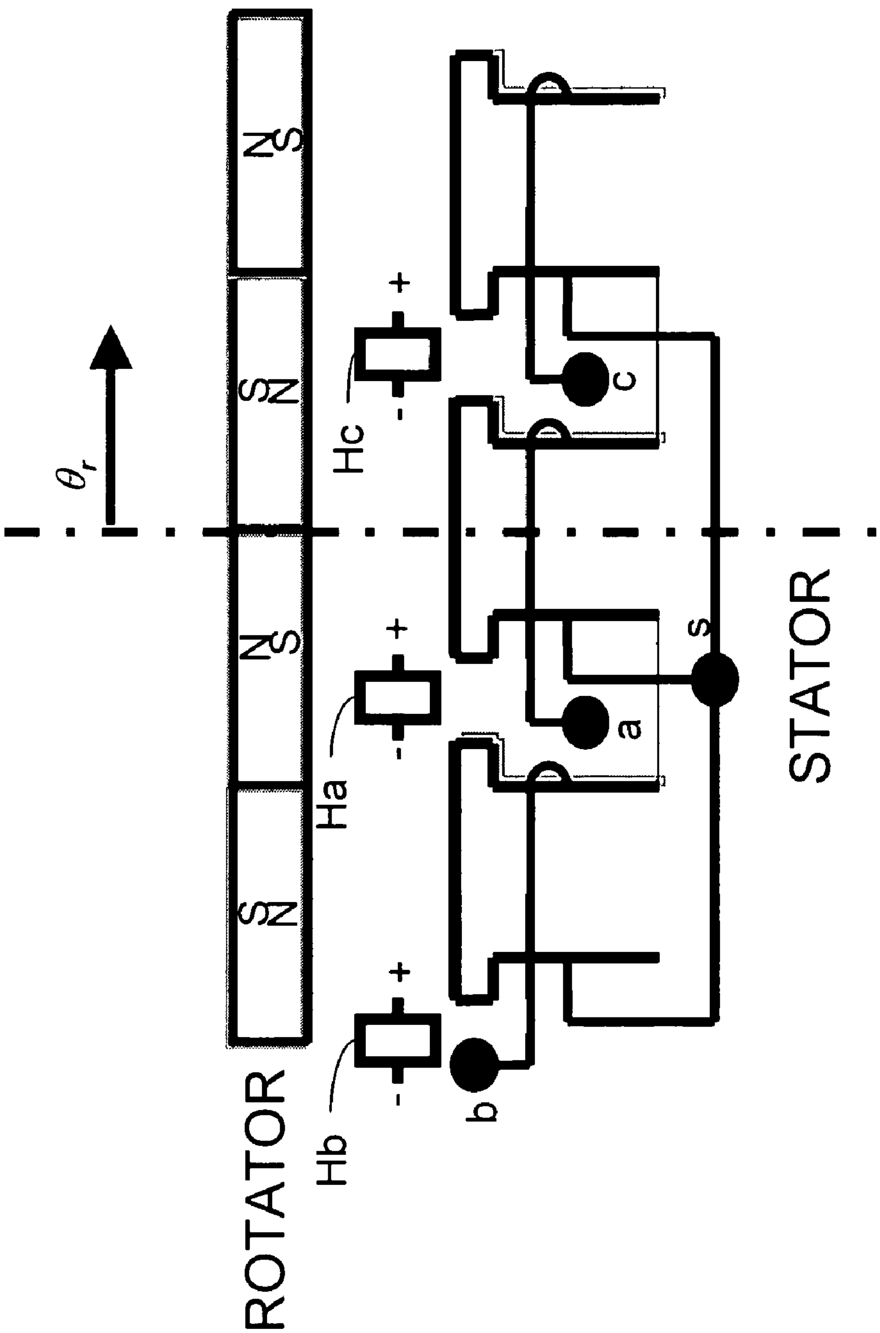
FIG. 3 illustrates a schematic diagram of the relative position between the stator and the rotor of the motor to be measured and the Hall elements.

A spindle motor, which is a DC non-brush motor and three-wired type in Y-connection, is chosen. The motor has three Hall elements $H_a$, $H_b$, and $H_c$ inside for replacing the rectifier and the brush. The respective position between the Hall elements and the stator and rotator of the motor is shown as FIG. 3. The driver may provide a correct phase-changing current to the motor while the Hall elements are sensing the magnetic field of the rotator such, that the motor may rotate continuously. The number of magnetic poles of the motor is 12, and the designed $K_{emax}$ is 0.00475 Volt/(rad/sec).

The respective outputs $H_a$, $H_b$, $H_c$ of the three Hall elements are $H_a^+$, $H_a^-$, $H_b^+$, $H_b^-$, $H_c^+$, $H_c^-$ respectively. A driver which is IC BA6849 manufactured by ROHM company (www.rohm.com) is employed to drive the chosen motor. The driver is driven by 180° six-step square wave. i.e., a three-phased driver.

Figure 4:
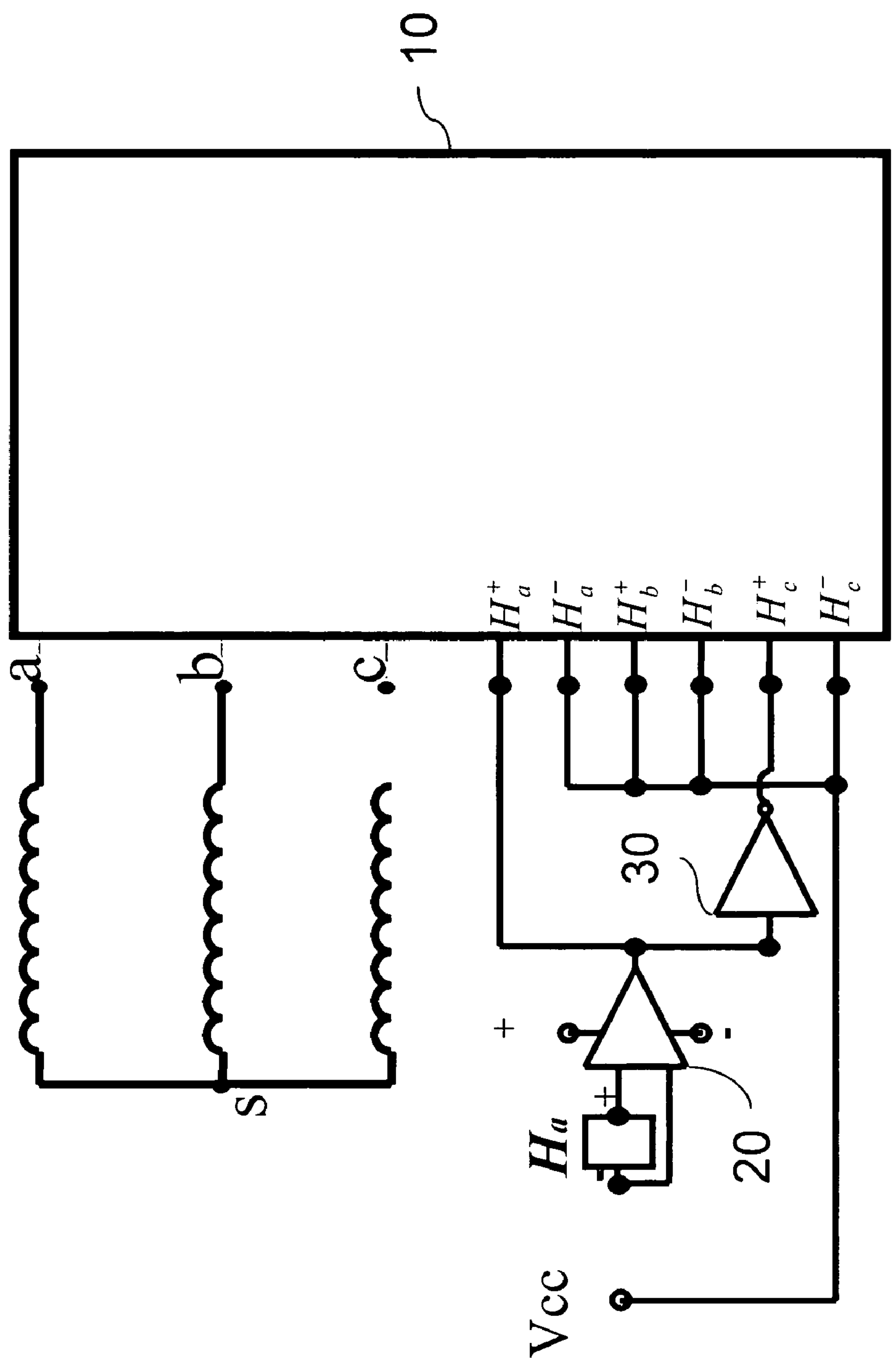
FIG. 4 illustrates the circuitry of motors working in single phase mode.

Some modification and design are introduced for enabling the motor to rotate in single phase mode. As illustrated in FIG. 4, the c phase winding of the motor cannot be connected to the driver. The phase a winding and phase b winding are connected to the driver 10. The Hall elements need some modification in order to be connected to the driver.

The signals of the Hall element $H_a$ are delivered to the driver 20 after being transformed into digital signals. The signals of the Hall elements $H_b$ and $H_c$ are not employed. The input signals of the pins $H_b^+$, $H_b^-$, $H_c^+$, $H_c^-$ of the driver 10 are counterfeited from the input of the pin $H_a$. It is noted that the input signal of the pin $H_c^+$ runs through an inverter 30 first. Accordingly, the driver may enable the motor to rotate in single phase mode. The six-phased change of a three-phased magnet-exit becomes a two-phased change of single-phased magnet-exit.

Figure 5:
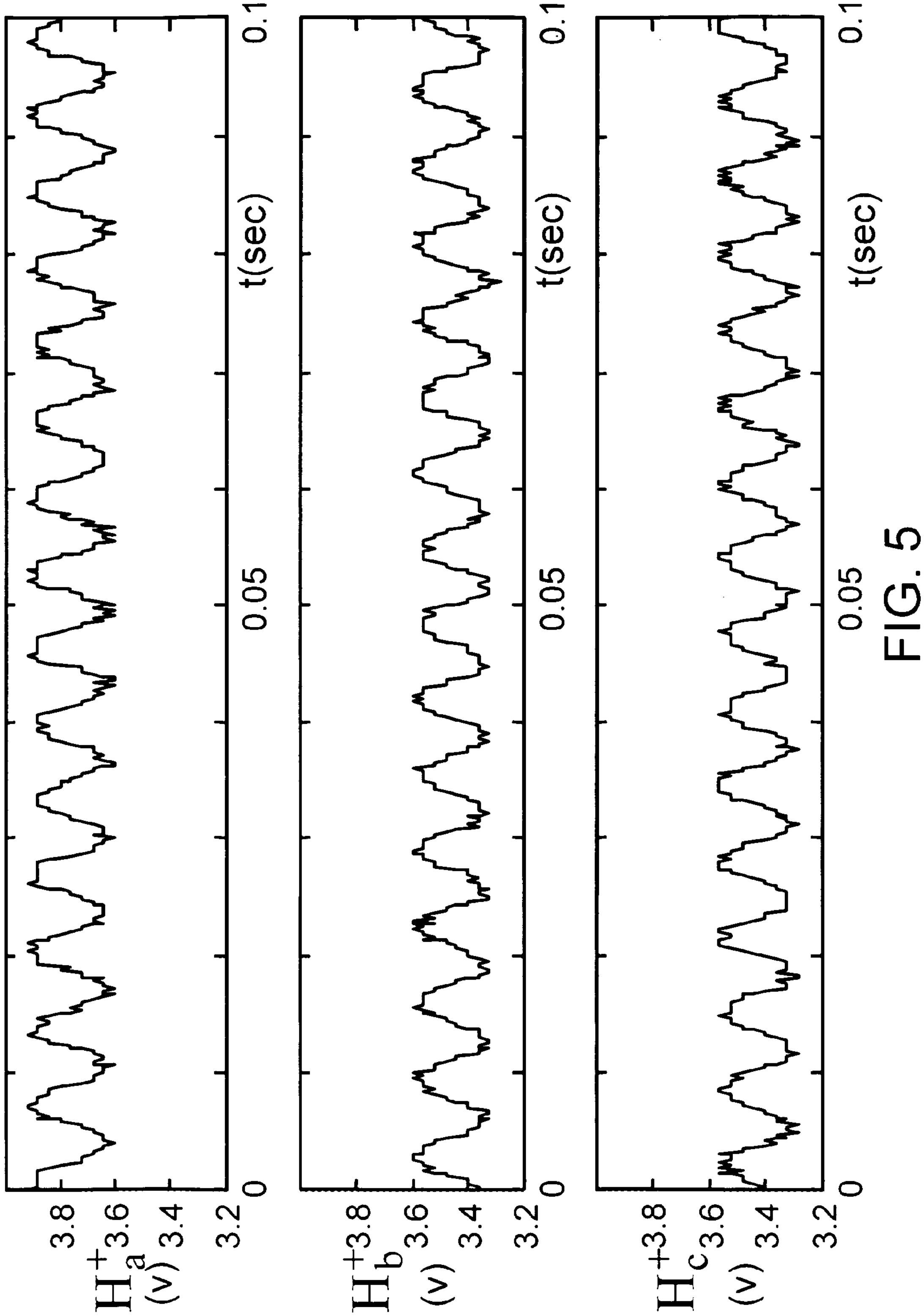
FIG. 5 illustrates the output signals of the Hall elements when working in three-phased mode.
Figure 6:
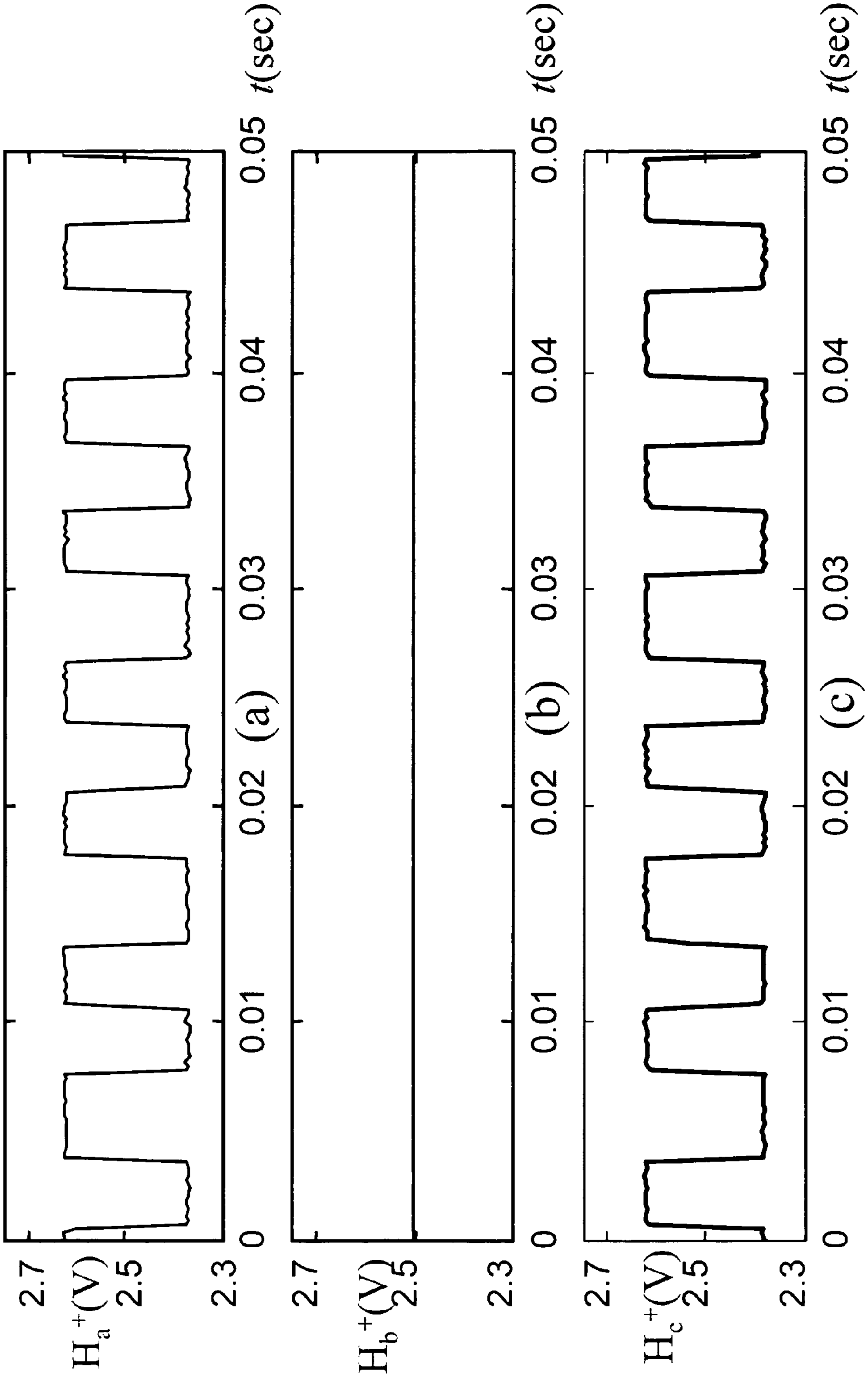
FIG. 6 illustrates the input signals received by the driver when working in signal-phased mode.

The output signals of the Hall elements when operating in three phase mode are illustrated in FIG. 5, in which there is angle difference of 120°. The input signals received by the driver when operating in signal phase mode are illustrated in FIG. 6.

Figure 7:
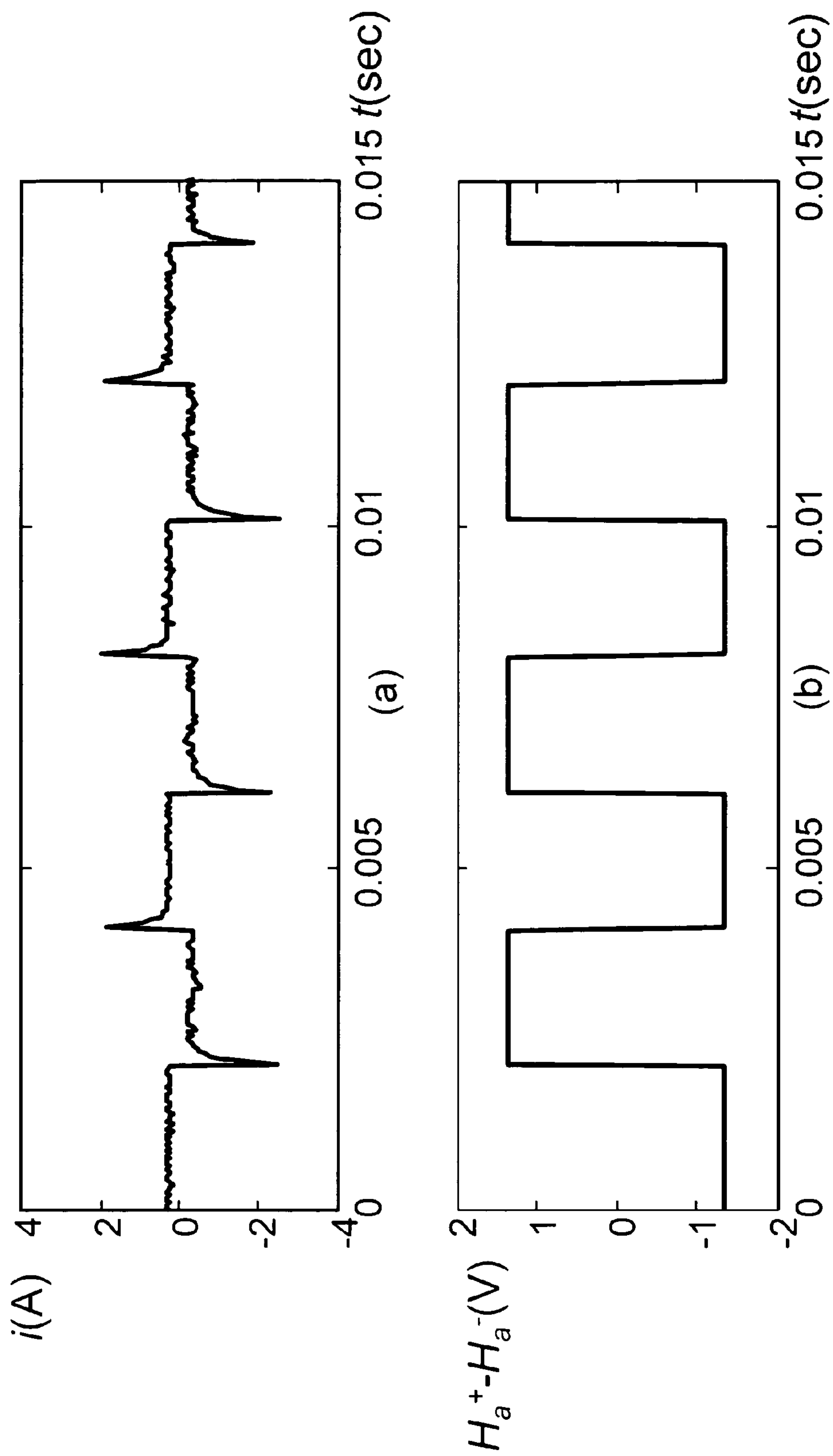
FIG. 7 illustrates the relationship between the phase current and time, and the relationship between the Hall elements and time.

For enabling the motor to rotate in single phase mode, the signals of FIG. 5 cannot be delivered to the driver directly without modification shown in FIG. 4. The modified signals as shown in FIG. 6 are then delivered to the driver such that the result shown in FIG. 7 is obtained. FIG. 7 illustrates the relationship between the phase current i of a phase winding and time, and the relationship between the Hall elements $H_a^+$-$H_a^-$ and time. The positive and negative logic of ($H_a^+$-$H_a^-$) is taken as the basis for state-changing of the phase current i. The period of the phase current i is 360° from the figure, and the positive current and the negative current are symmetric. Accordingly, the motor rotates in single mode indeed.

Figure 8:
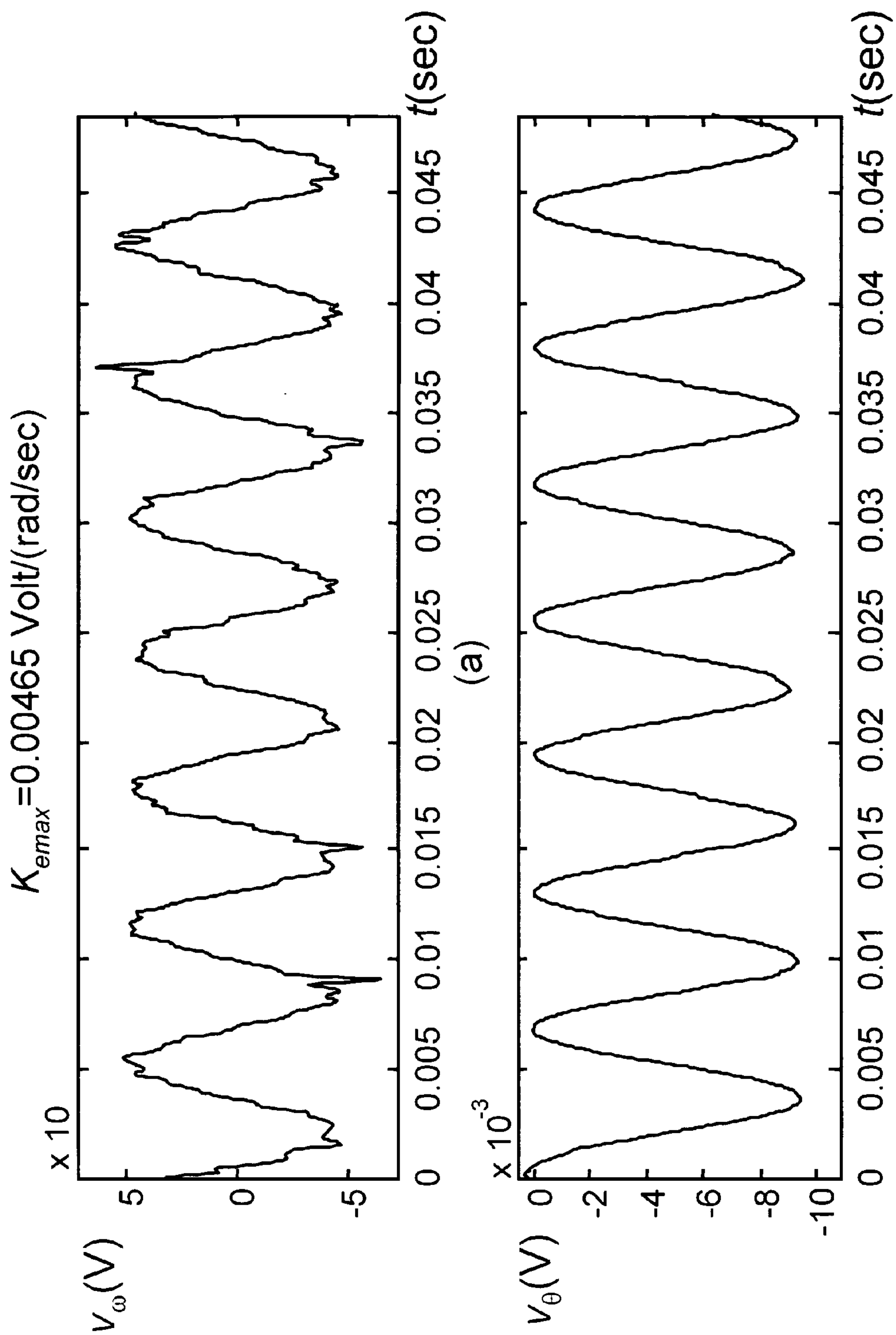
FIG. 8 illustrates the relationship between $v_{107}$ and time and the relationship between $v_\theta$ and time when working in single phase mode.

FIG. 8 illustrates the relationship between $v_\omega$ and time and the relationship between $v_\theta$ and time when working in single phase mode. $v_\theta$ is the integral obtained from a digital integral device. In FIG. 8, $v_{dc}$=−0.00468 V, and $K_{emax}$=0.00465 Volt/(rad/sec) from equation (8), which is very similar to the specification.

Accordingly, the disclosed method of the invention may be employed to examine the magnetization intensity of the permanent magnet of the rotator, or may be applied in test machines measuring $K_{emax}$ automatically, to be reference for choosing motors or controllers. Furthermore, the disclosed method may be applied to the self-diagnosis process of universal drives for obtaining the electromotive force constant of motors connected and may be applied to controllers for auto-turning.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A method for measuring the electromotive force constant of a motor, comprising steps of:

enabling the motor to rotate in single phase mode;

measuring phase voltages of the motor when the motor rotates to a predetermined velocity; and obtaining the electromotive force constant of the motor according to the relationship of the phase voltages and the predetermined velocity, wherein the relationship of the phase voltages and the predetermined velocity is $$v_\omega(t) = K_{emax}\cos\left(\theta_r + \frac{2\pi}{3}\right)\omega_r = \left(\frac{v_a + v_b - 2v_c}{-3}\right)\left(\frac{P}{2}\right),$$

wherein $v_a$, $v_b$, $v_c$ are the phase voltages of the motor, $\omega_r$ is the velocity of the motor, $K_{emax}$ is the electromotive force constant of the motor, $\theta_r$ is the electrical angle of the rotator of the motor, P is the number of the magnetic pole of the rotator magnet.

2. The method of claim 1, wherein the motor comprises a three-phase permanent magnet motor.

3. The method of claim 2, wherein one phase of the motor is open, and the other two phases are connected in series.

4. The method of claim 1, wherein the velocity of the motor is output from a velocity encoder.

5. The method of claim 1, wherein the electromotive force is the accelerating current peak value of the integral of the relationship of the phase voltages and the predetermined velocity.

6. The method of claim 1, wherein the single phase mode is driven by a three-phased driver.

7. The method of claim 6, wherein the driver continues providing currents when the motor rotates to the predetermined velocity.

8. The method of claim 6, wherein the driver stops providing currents when the motor rotates to the predetermined velocity.

9. The method of claim 1, wherein the single phase mode is driven by a one-phased driver.

10. The method of claim 9, wherein the driver continues providing currents when the motor rotates to the predetermined velocity.

11. The method of claim 9, wherein the driver stops providing currents when the motor rotates to the predetermined velocity.

* * * * *